Dec. 28, 1965  M. H. SWEET  3,226,552
PHOTOMULTIPLIER ZERO LEVEL CONTROL CIRCUIT
Filed April 2, 1962  2 Sheets-Sheet 1

INVENTOR.
MONROE H. SWEET, DECEASED
By RUSSELL P. EASTON, ADMINISTRATOR

BY *Frederick V. Dutcher*

ATTORNEY 3,226,552
PHOTOMULTIPLIER ZERO LEVEL
CONTROL CIRCUIT
Monroe H. Sweet, deceased, late of Hillcrest, N.Y., by
Russell P. Easton, executor, assignor to General Aniline
& Film Corporation, New York, N.Y., a corporation of
Delaware
Filed Apr. 2, 1962, Ser. No. 184,474
4 Claims. (Cl. 250—207)

This application is a continuation-in-part of my co-pending application, Serial No. 71,827, filed April 12, 1960, now Patent No. 3,102,202 and is particularly directed to improvements in the control circuit disclosed in FIG. 5 thereof.

This invention relates to photoelectric densitometric apparatus and, more particularly, to an improved circuit arrangement for control of the photomultiplier tube generally employed in such circuits.

In the art of photography and particularly in the manufacture of sensitized photographic materials, it is important to have measuring facilities which permit accurate and efficient evaluation and interpretation of the densities of test samples.

Various instruments have been devised for this purpose and, among these, densitometers constructed in accordance with the teachings of applicant's U.S. Patents 2,457,747; 2,478,163; and 2,492,901 have found large commercial acceptance.

It is the primary object of this invention to extend the operative function of the photomultiplier tube circuit employed in the densitometer and, in particular, to effect zero density equilibrium conditions with constant repetitive accuracy for every density evaluation function.

A particular feature of the circuit improvement herein described is the increased stability and compensation effected which substantially eliminates the inherent non-linearity between density and effective dynode voltage of the photomultiplier tube representing the density value.

Other objects and features will be apparent from the following description of the invention, pointed out in particularity in the appended claims and taken in connection with the accompanying drawings in which:

Identical reference characters denote corresponding component elements in both figures.

Figure 1:
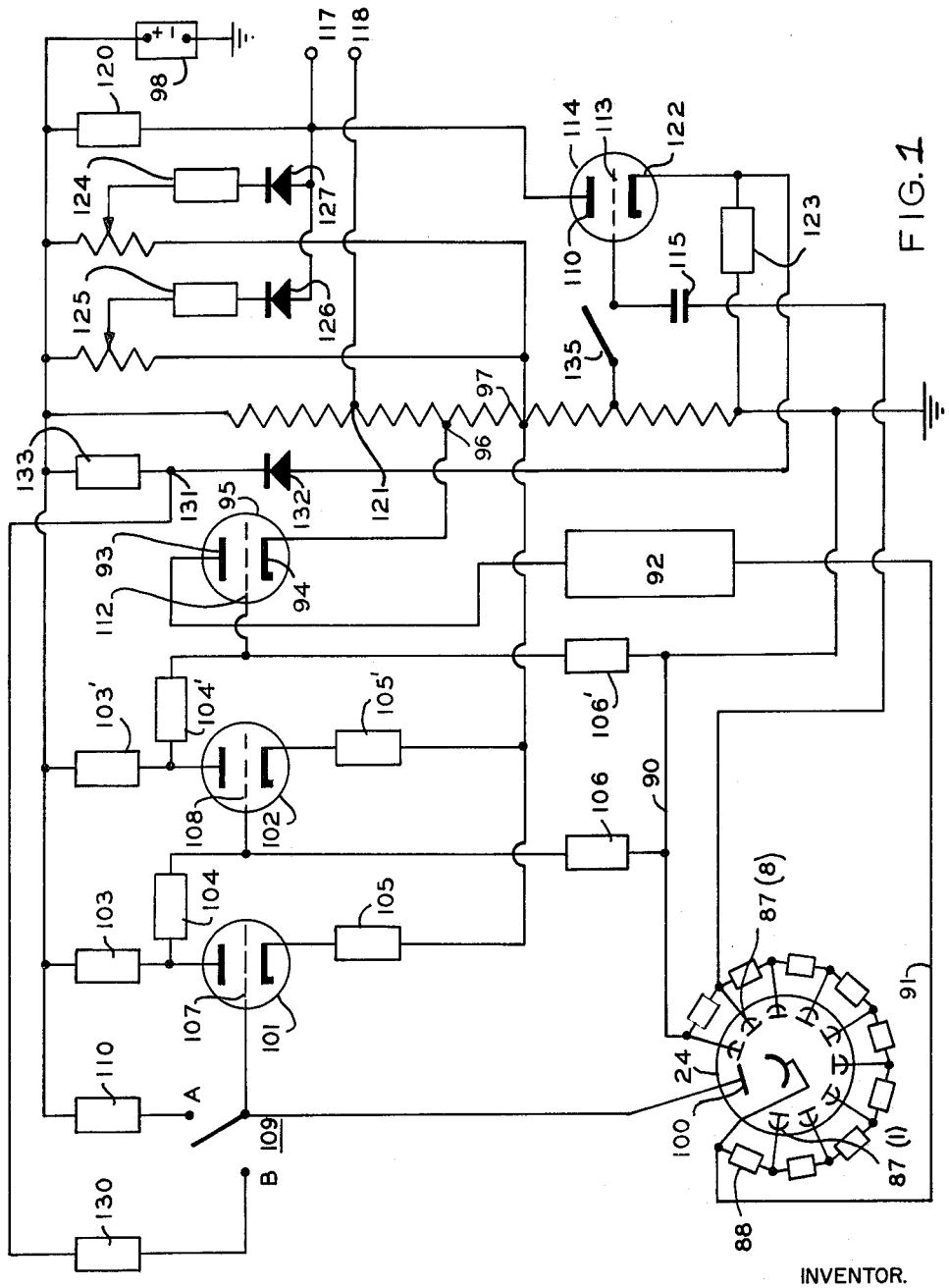
FIG. 1 is a schematic representation of the photomultiplier tube circuit used in the densitometer as described in connection with FIG. 5 of my co-pending application, referred to above, and is identical therewith.

Referring to the drawings, the circuits shown are, in basic detail, similar to the circuits described in the aforementioned patents except for the improvements effected in accordance with the present invention.

As seen in FIG. 1, the dynode elements 87 of the photomultiplier tube 24 are serially interconnected by resistors 88(1)–88(9), thus forming a voltage divider network between cathode 89 and the ground potential side of the system. This connection is effected by leads 90 and 91, the circuit being completed through the power source 92, anode 93, and cathode 94 of the first control tube 95 to the voltage tap point 96 of the voltage divider resistor 97 which connects across the terminals of another power source 98, the negative side of which returns to the common ground terminal. The current in this circuit is determined by the conductivity of the tube 95 which, in turn, establishes the voltage drop across the dynode resistors 88 and thus the effective dynode voltages.

For the sake of simplicity, no illustration is given of a light source which must necessarily be employed for producing a light flux which impinges on the cathode 89 of the phototube 24. This is standard practice in any photometric arrangement and the invention is not concerned with this phase of the apparatus. However, this is fully illustrated and described in my co-pending application referred to above.

Since the invention is directed to electronic means for establishing a zero density reference level, it should suffice to point out that zero density in the photometric evaluation of photographic densities means the condition of maximum illumination of the photocathode, such as the cathode 89 of the multiplier tube 24, from a light source of predetermined light intensity. In other words, the maximum available light flux impinging on the photocathode when there is no sample to obstruct or to modify this light.

The feedback circuit for controlling the dynode voltage and thereby maintaining the anode current of the photomultipiler tube 24 substantially constant in the operating range of density D=3 is taken from the anode 100 through a two-stage, D.C. amplifier comprising vacuum tube 101 and 102.

The amplifier circuit is conventional. The anode, grid, and cathode resistors 103, 104, 105 and 106, respectively, in the first stage, and similar resistors referenced with primary indices in the second stage, are proportioned to establish proper operating potentials for the vacuum tube elements. The grid 107 of the tube 101 is connected directly to the anode 100 of the multiplier tube 24 and also to the moving contact of a single-pole, double-throw switch 109 which selects the 0–3 or 0–6 density ranges of the instrument. In the position indicated at A, the switch 109 connects to the resistor 110 which, being connected to the positive terminal of the power source 98, functions as the anode load resistor of the multiplier tube 24.

Position A of the switch 109 establishes the 0–3 density range of the circuit in that the anode current of the multiplier tube is held substantially constant. This is effected by the control tube 95, the grid 112 of which, being connected to the output circuit of the amplifier tube 102 between resistors 104' and 106', regulates the current conductivity thereof and thus determines the dynode voltage, as mentioned before.

The signal voltage output of the photomultiplier tube 24 is taken from the dynode 87(8) and applied to the grid 113 of the output tube 114 through a coupling condenser 115.

In position B of the switch 109, the anode 100 of the multiplier tube 24 as well as the grid 107 of the amplifier tube 101 connect to the load resistor 130 which returns to a supply voltage tap 131 at the junction point between the cathode of the diode 132 and the resistor 133, the latter terminating at the positive side of the power supply 98. The anode of the diode 132 connects to the cathode 122 of the output tube 114.

Referring to the operation of the circuit, when the light received by the photomultiplier tube is increased, the grid 107 of the tube 101 is momentarily driven more negative. This causes the anode potential of this tube to become more positive and, with it, the grid 108 of the tube 102. Therefore, the anode of the tube 102 is driven in a negative direction, carrying with it the grid 112 of the control tube 95. The dynode voltage controlled by this tube is reduced. This action reduces the sensitivity of the multiplier tube and restricts the anode current. An equilibrium anode current is reached almost instantaneously. The voltage gain of the two amplifier stages, comprising tubes 101 and 102, is relatively high.

However, the cathode load resistors 105 and 105' provide sufficient degeneration to give excellent stability. The net result is that over the whole operating range of the circuit the potential of the grid 107 of the tube 101 is very nearly constant. Furthermore, since the operating conditions of the tube 101 are such that the grid current is negligible, the photomultiplier anode current is maintained very nearly constant.

The output signal is derived from the output tube 114. This is driven through the coupling condenser 115 by the voltage developed between 87(9), 87(8). Therefore, to a close approximation, the anode-cathode current of the tube 101 varies linearly with dynode voltage. In the standby condition, switch 135 is closed. This holds the grid 113 of the tube 114 at a constant value such as to give an anode load drop producing zero signal output. The effects of drift of the sensitivity of the photomultiplier tube and light output of the illuminating system as well as minor changes in efficiency of the optical system are eliminated during each standby switching cycle.

It was mentioned before that in the density range of 3, the operation was such that the anode current of the photomultiplier tube was held nearly constant. In the density range of 6 which is obtained when the switch 109 is in position B, the anode current of the photomultiplier tube is varied deliberately in such a manner as to have a variation which is non-linear with dynode voltage variation.

This is obtained by the particular characteristics of the resistor 130 which is preferably a silicon carbide resistance element or one of similar material where the effective resistance varies inversely with current variations. The variation of current through the resistor 130 in accordance with changes in dynode voltage is obtained from the circuit which connects the load resistor 130 to the cathode 122 of the tube 114, this connection being effected, as stated before, through the diode 132. The latter operates as a zener diode to elevate the cathode voltage of the tube 122 to the reference level necessary to provide a bias for the load resistor 130.

Figure 2:
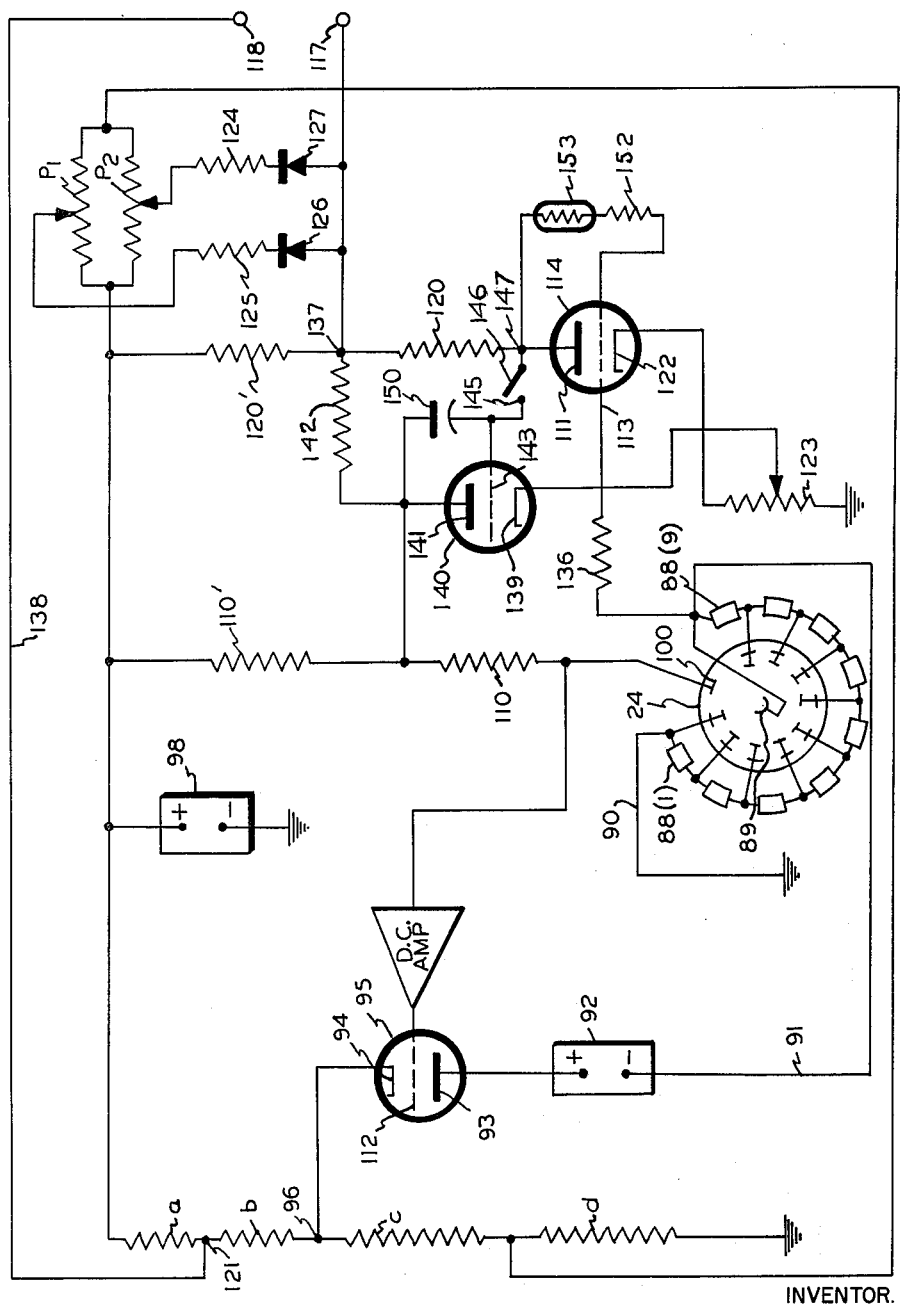
FIG. 2 is a simplified schematic representation of the photomultiplier tube circuit similar to the one shown in FIG. 1 and includes the modifications and improvements in accordance with the present invention.

Referring to FIG. 2, the circuit has been considerably simplified for easier presentation and a better understanding of the function thereof. The amplifier, consisting of vacuum tubes 101 and 102 shown in FIG. 1, is indicated here by a conventional symbol referenced "D.C. amp.," and transfers the variation of voltage of the anode 100 of the photomultiplier tube 24 onto the grid 112 of the dynode voltage control tube 95. The anode 93 of the latter is connected to the cathode 89 of the photomultiplier tube 24 in series with power supply source 92. The cathode 94 of the tube 95 is connected to the tap 96 of the voltage divider 97 placed across the terminals of the D.C. power supply source.

The above-described circuit corresponds in fact to the basic dynode voltage feedback circuit described in the patents to which reference was made in the preamble.

The output circuit is similar, as far as the diode compensating network is concerned, to the one shown in FIG. 1 and described in U.S. Patent 2,492,901. Consequently, it need not be referred to in greater detail.

Potentiometers $P_1$ and $P_2$ connected in parallel are fed from the voltage divider 97 comprising resistors $a$, $b$, $c$, and $d$, in series. The riders of $P_1$ and $P_2$ connect to diodes 126 and 127 through series resistor elements 125 and 124, respectively, and thus form a shunt of unidirectional conductivity between the power supply and the output terminal 117.

The improvement in accordance with the present invention will now be described. The voltage of the dynode elements at the cathode 89 represents the signal output of the phototube 24 and is applied to the grid 113 of the output tube 114 through the series resistor 136. The anode load of the output tube 114 comprises resistors 120 and 120' in series between anode 111 and the positive terminal of source 98. The junction point 137 of resistors 120 and 120' connects to the output terminal 117, whereas the other output terminal 118 is tied by means of the conductor 138 to the point 121 of the voltage divider 97. Cathode 122 of the output tube 114 returns to the ground potential side of the supply 98 through the potentiometer 123, the rider of which connects to the cathode 139 of the zero level control tube 140. It is to be noted that the grid 113 of the output tube 114 is also connected to the anode 111 through a network consisting of the ohmic resistor 152 and the non-linear resistor 153 in series. The latter has a negative resistance characteristic in that the effective resistance thereof varies inversely with the current flowing therethrough. The function of this anode to grid feed will be explained later.

The zero level control tube 140 has the anode 141 thereof connected directly to the junction point of resistors 110 and 110' as well as to the junction point of resistors 120 and 120' through the resistor 142. The grid 143 of the tube 40 connects to contact element 145 of the switch 146, the other contact element 147 thereof being connected to the anode 111 of the tube 114. A capacitor 150 is placed between the anode 141 and the grid 143 of the tube 140.

The function of the zero level control tube 140 is, in essence, to restore the effective dynode voltage of the phototube 24 to a predetermined level which represents zero density or maximum light flux reaching the phototube so that the same reference level be established at the start of every measuring operation.

The operation of the circuit will now be considered.

The normal function of the photomultiplier tube 24 is well known and needs only brief mention here as a basis for understanding the function of the zero level control tube 140. Light impinging on the cathode 89 will cause electron emission which produces secondary emissions from the dynode elements in such sequence that the emissions effect is greatly magnified. The final secondary emission is attracted to the anode 100 from the last dynode element causing a current flow which lowers the voltage on the anode electrode. The voltage change is fed back through the D.C. amplifier onto the grid of the control tube 95, decreasing its conductivity and thus lowering the voltage of the dynode elements. This, in turn, reduces the anode current of the phototube to an equilibrium value. By "equilibrium value" is meant the state of the quiescent condition when the phototube current is stabilized at a certain value. This value is maintained by the control tube 95 as a function of the dynode voltage. For the measursing operation, it is essential that the phototube equilibrium be at a predetermined dynode voltage value, namely, the one which is obtained when light flux from the source utilized excites the phototube cathode 89 without being impeded by any sample through which light would have to pass. This is the zero density level, i.e., the reference level at which photometric measuring proceedings should start. It is from this level that readings of changes in dynode voltage must be taken in evaluation of the density of samples.

In the circuit of FIG. 1, zero reference level is established by manually restoring the voltage of grid 113 of the output tube 114 by closure of the switch 135 to a predetermined value which was found to give zero output at zero density. Thus, the output circuit is re-set to give null indication, assuming that the quiescent operating level of the phototube is at the same dynode voltage at all times.

While this method of zero level setting has given satisfactory results, it was found lacking in accuracy in the evaluation of colored samples. In such work, colors filters are interposed between the light source and the phototube and it is very difficult to match the individual filters so that identical phototube response be had for all the three colors that are generally used. Therefore, if there is appreciable unbalance, the zero density dynode voltage can be quite different for one color filter than for another. This would result in inaccurate evaluation of samples.

In the circuit in accordance with the invention as shown in FIG. 2, the zero reference setting does not change the operating conditions of the output tube by readjusting the output signal to prevailing conditions of dynode voltage. Instead, the operating dynode voltage at zero density or maximum light flux is preserved and re-set to the same value at the start of photometric evaluation work.

The zero level control tube 140, in essence, performs a second feedback function, namely, from the output circuit to the phototube anode circuit. For this purpose, the load resistance of the anode 100 is in two sections, namely, resistors 110 and 110' in series, and the junction point of these is tied to the anode 141 of the control tube 140. The bias voltage of the cathode 139 is adjusted by means of the potentiometer 123 to be somewhat more positive than the potential of the anode 111 of the output tube 114 when the phototube is energized by light flux representing zero density. This adjustment establishes the threshold of conductivity of the tube 140.

At any time when zero density setting is to be established, the switch 146 is closed. If, at the instant of closure, the potential of the anode 111 is positive with respect to the cathode 122, the tube 114 becomes conductive, causing a voltage drop at the junction point between resistors 110 and 110' which, in effect, results in a lowering of the effective anode voltage of the phototube. The equilibrium condition is now altered and the first feedback circuit is induced into corrective action effected by the control tube 95, resulting in readjustment of the dynode voltage to equilibrium value. Since the output tube 114 is coupled directly to the cathode 89, the corrective action will effect conductivity of the tube 114 until an anode voltage drop across resistor 120 is reached which is negative with respect to the cathode 122 and quiescent equilibrium condition is again established for the phototube 24. Thus, any moderate shift of light intensity at zero setting which would cause a change in density output indication is eliminated by this automatic readjustment of the anode potential of the phototube.

In practice, the relationship between density and dynode voltage is never perfectly linear. When the output circuit is compensated to zero, the distortion will occur at different density levels; whereas, by the present zero level setting, the operating dynode voltage corresponding to zero density is preserved and the same output indication will be obtained for all color work as to reference level.

After equilibrium condition has been established, the switch 146 is opened and the grid cathode voltage of the tube 140 is held by the charge of the condenser 150 during the interval of subsequent photometric measurements. When, upon closure of the switch 146, the zero reference control tube 114 is actuated, it will produce a slight shift in the output circuit balance. This is corrected by the current feed through the resistor 142. The phase of this current is such that it tends to offset the slight shift in the output caused by the switching referred to above and thus compensates for this shift. Lowering the ohmic value of this resistor will increase the corrective current and, below a certain value, there would be an overcompensation. However, the proper value, which can easily be determined empirically, will fully compensate for the residual error over a complete range of optical flux densities.

A further refinement of compensation is provided by the network consisting of resistor elements 152 and 153. As the dynode voltage increases, the anode voltage of the tube 114 is lowered. Thus has the effect of driving the grid 113 in the negative direction. A change of potential in this direction, on the other hand, will increase the anode potential at 111. The corrective feedback network 152, 153 tends to drive the grid 113 positive and thus opposes the tendency of grid 113 to be driven negative. The result is that an equilibrium operating grid voltage is established so that the anode potential of the output tube 114 is a linear function of the dynode voltage and can also be used as a measure thereof.

However, if both resistors in the feedback network are purely ohmic and the gain of tube 114 is so high that it can be considered infinite, then the anode voltage will be strictly linear with dynode voltage. If one of the resistor elements, such as 153, be a non-linear type, such as silicon carbide, the resultant network will have such characteristics as to compensate for the non-linear relationship between dynode voltage and density of the sample.

It has been found in practice that values can be selected which will give a substantially linear net relation between density and output at the terminals 117, 118 over the entire range of density scale from 0–4.

What is claimed is:

1. In a photometric circuit, the combination which comprises a photomultiplier tube having anode and cathode electrodes and a plurality of dynode elements, a source of energizing potential, a first feedback circuit including a first control tube in series between said dynode elements and said source, whereby the current conductivity of said tube determines the effective dynode potential, said potential representing the output of said photomultiplier tube, and an output circuit including an output vacuum tube responsive to said dynode potential, a second feedback circuit operable simultaneously with said first feedback circuit said second feedback circuit being connected between said output tube and said anode including a second control tube, the conductivity of which alters the effective anode potential of said photomultiplier tube, biasing means for adjusting the threshold of conductivity of said second control tube for conditions of maximum light flux impinging on the cathode of said photomultiplier tube, switching means initiating operation of said second control tube whereby, upon actuation of said switching means at said light flux level, the anode voltage of said photomultiplier tube becomes altered by the current conductivity of said second control tube inducing thereby activation of said first feedback circuit for establishment of quiescent equilibrium conditions of said multiplier tube at said light flux level.

2. In a photometric circuit, the combination which comprises a photomultiplier tube having anode and cathode electrodes and a plurality of dynode elements, a source of energizing potential, a first feedback circuit including a first control tube in series between said dynode elements and said source, whereby the current conductivity of said tube determines the effective dynode potential, said potential representing the output of said photomultiplier tube, and output circuit including an output vacuum tube responsive to said dynode potential, a second feedback circuit between said output tube and said anode operable simultaneously with said first feedback circuit and including a second control tube having anode, cathode and grid electrodes, the conductivity of said second tube altering the effective anode potential of said photomultiplier tube, cathode biasing means for adjusting the threshold of conductivity of said second control tube for conditions of maximum light flux impinging on the cathode of said photomultiplier tube, switching means interconnecting the anode of said output tube with the grid of said second control tube whereby, upon actuation of said switching means at said light flux level, the grid potential of said second control tube is conditioned to determine the conductivity in accordance with said threshold bias for altering the anode voltage of said photomultiplier tube and thereby initiating corrective action of said first control tube and voltage holding means associated with said second control tube for maintaining said grid potential for a predetermined time after opening of said switching means.

3. A circuit in accordance with claim 2 wherein said voltage holding means comprises a capacitor connected between grid and anode of said second control tube.

4. A circuit in accordance with claim 2 wherein said cathode biasing means comprises a potentiometer connected between cathode of said output tube and the ground potential side of said source of energizing potential, the cathode of said second control tube being connected to the rider of said potentiometer.

References Cited by the Examiner
UNITED STATES PATENTS

| | | | |
|---|---|---|---|
| 2,605,430 | 7/1952 | Marcy | 250—207 |
| 2,841,718 | 7/1958 | Hoover | 250—214 |
| 2,982,860 | 5/1961 | Nehrbas et al. | 250—207 |
| 3,042,805 | 7/1962 | Boersma | 250—207 |

RALPH G. NILSON, *Primary Examiner.*
WALTER STOLWEIN, *Examiner.*

Disclaimer

3,226,552.—*Monroe H. Sweet,* deceased, late of Hillcrest, N.Y., by *Russell P. Easton,* executor. PHOTOMULTIPLIER ZERO LEVEL CONTROL CIRCUIT. Patent dated Dec. 28, 1965. Disclaimer filed Sept. 30, 1982, by the assignee, *Eastman Kodak Co.*

Hereby enters this disclaimer to all claims of said patent.

[*Official Gazette April 5, 1983.*]